(12) United States Patent
Williams

(10) Patent No.: US 7,861,354 B1
(45) Date of Patent: Jan. 4, 2011

(54) MULTIPURPOSE GARDENING TOOL

(76) Inventor: Johnny Ray Williams, 2601 NW. 207 St., Apt. 141, Miami Gardens, FL (US) 33056

(*) Notice: Subject to any disclaimer, the term of this patent is extended or adjusted under 35 U.S.C. 154(b) by 660 days.

(21) Appl. No.: 11/854,307

(22) Filed: Sep. 12, 2007

(51) Int. Cl.
A01D 7/00 (2006.01)
(52) U.S. Cl. .................. 15/105; 15/257.2; 15/104.8
(58) Field of Classification Search .............. 15/105, 15/257.2, 104.8; 206/234, 576, 349, 361, 206/362.2, 362.3, 15.2, 15.3; 7/114
See application file for complete search history.

(56) References Cited

U.S. PATENT DOCUMENTS 3,018,502 A * 1/1962 Lossius ............... 15/257.2
3,242,513 A * 3/1966 Janke .................. 7/116
3,668,850 A * 6/1972 Horkey ............... 56/400.04
4,769,869 A * 9/1988 Benitez ............... 15/115
4,843,667 A * 7/1989 Hanly, Sr. ............ 7/114
2004/0090073 A1* 5/2004 Edwards et al. .......... 294/1.3
2006/0288509 A1* 12/2006 Tomm ................ 15/159.1

* cited by examiner

Primary Examiner—Monica S Carter
Assistant Examiner—Stephanie Newton
(74) Attorney, Agent, or Firm—Albert Bordas, P.A.

(57) ABSTRACT

A multipurpose gardening tool that comprises a broom assembly, a housing assembly for disposable bags, a spike assembly, a rake assembly, and a dustpan assembly. The multipurpose gardening tool can be readily assembled and disassembled into different configurations or can be combined to form one single tool. The multipurpose gardening tool can be utilized in commercial or residential settings for gardening and landscaping, whereby each can detach from each other to utilize each of the above defined in a manner that corresponds with the work to be accomplished.

12 Claims, 4 Drawing Sheets

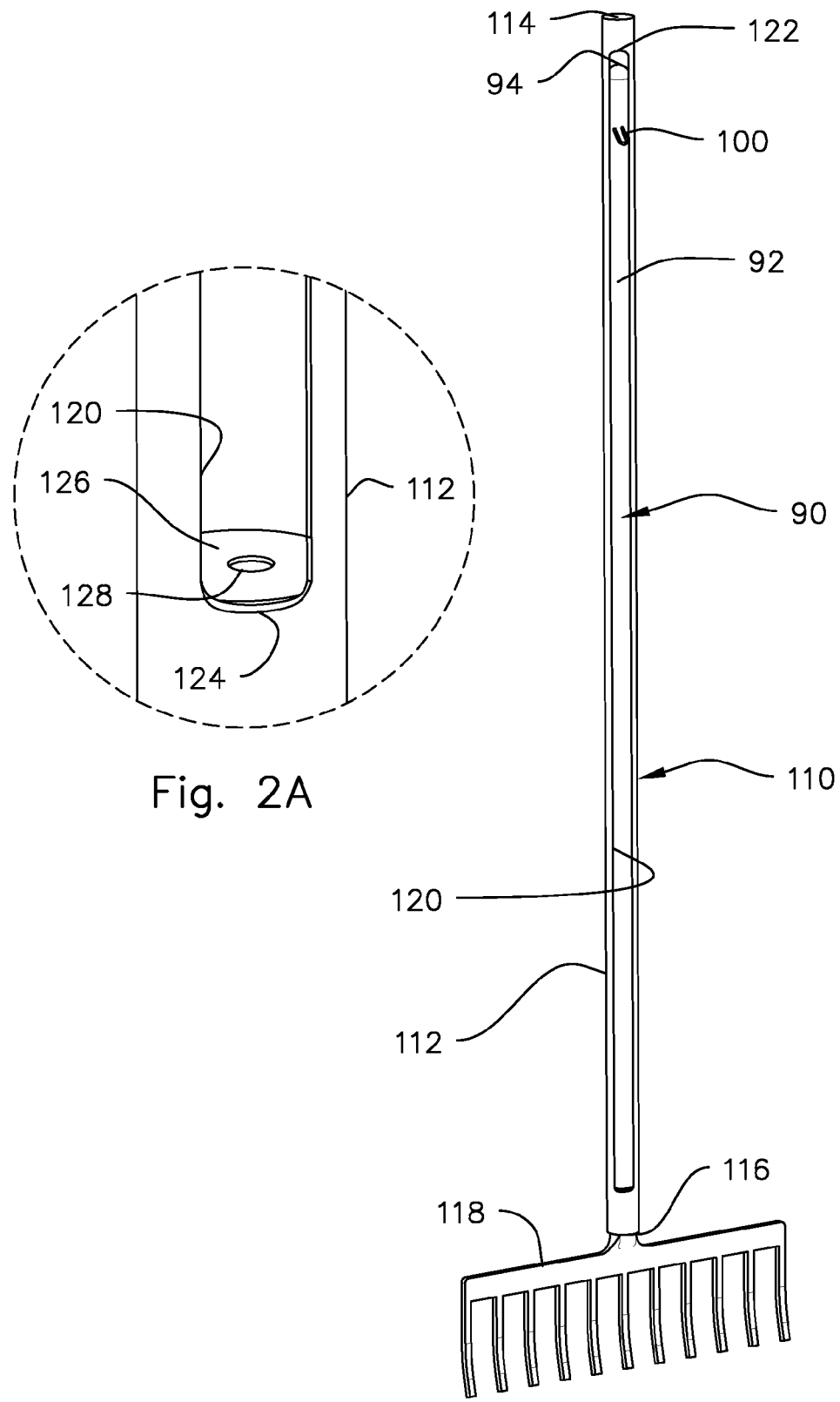

MULTIPURPOSE GARDENING TOOL

BACKGROUND OF THE INVENTION

1. Field of the Invention

The present invention relates to gardening equipment, and more particularly, to a multipurpose gardening tool comprising a broom assembly, a housing assembly, a spike assembly, a rake assembly, and a dustpan assembly.

2. Description of the Related Art

Whether in commercial or residential settings, gardening and landscaping often requires a multitude of tools, including but not limited to brooms, housings for waste bags, spikes, rakes, and dustpans. For users in charge of maintaining commercial and residential gardening and landscaping grounds, these duties are complicated by having to transport a multitude of the different tools defined above to perform their work. Often times these type of tools are stored in a shed or in a work truck. In the event the user forgets a tool, he/she has to make another trip to that shed or work truck to obtain the required tool to complete a task, thus wasting valuable time traveling to and from the location where the tools are stored.

There is a need for a multipurpose gardening tool comprising a broom assembly, a housing assembly, a spike assembly, a rake assembly, and a dustpan assembly to solve this problem in an efficient and economical way.

SUMMARY OF THE INVENTION

A multipurpose gardening tool, comprising a broom assembly having a first elongated handle and first and second ends. The elongated handle is tubular and comprises a first notched cutout having third and fourth ends. The elongated handle further comprises a plate mounted at the first end. The plate has an L bracket.

A housing assembly has fifth and sixth ends. The fifth end has a cap hingedly mounted thereon and the sixth end is removably mounted onto the second end. The housing assembly has a slit extending from the fifth end towards the sixth end without reaching the sixth end. The housing assembly houses at least one disposable bag and an end of the disposable bag protrudes from the slit.

A rake assembly comprises a second elongated handle having seventh and eighth ends, and a rake that is mounted onto the seventh end. The second elongated handle is tubular and comprises a second notched cutout having ninth and tenth ends. The ninth end has a ring comprising a through hole. The rake assembly snaps into the broom assembly.

A spike assembly comprises a third elongated handle having eleventh and twelfth ends, and a spike is mounted onto the eleventh end. The spike assembly snaps into the rake assembly.

A dustpan assembly comprises a fourth elongated handle having thirteenth and fourteenth ends, and a dustpan is mounted onto the thirteenth end. The fourth elongated handle is tubular and comprises a third notched cutout. The dustpan assembly snaps onto the broom assembly.

The broom assembly comprises a straight tubular member. The second end comprises internal female threads. The plate is fixedly mounted onto the first elongated handle with a bracket. Secured onto the L bracket, is a brush head having bristles.

The sixth end comprises male threads that cooperatively match the internal female threads. The housing assembly further comprising an internal central pin housed within. A plurality of disposable bags forms a roll that is mounted onto the internal central pin. The disposable bags have perforations.

The second elongated handle is also straight, and the rake has cooperative dimensions and shape to rest on the L bracket when the rake assembly snaps into the broom assembly. The spike aligns with and travels through the hole and the eleventh end rests upon the ninth end when the spike assembly snaps into the rake assembly. The dustpan is hingedly mounted onto the fourth elongated handle and can rotate approximately 90-degrees with respect to the fourth elongated handle. The dustpan is approximately in a vertical position and rests upon the L bracket when the dustpan assembly snaps onto the broom assembly.

The second elongated handle snaps into the first elongated handle, whereby the first elongated handle has a first cooperative inside diameter to snugly receive the second elongated handle through the first notched cutout. The third elongated handle snaps into the second elongated handle, whereby the second elongated handle has a second cooperative inside diameter to snugly receive the third elongated handle through the second notched cutout. The fourth elongated handle snaps onto the first elongated handle, whereby the fourth elongated handle has a third cooperative inside diameter to snugly receive the first elongated handle through the third notched cutout.

The broom assembly, the housing assembly, the spike assembly, the rake assembly, and the dustpan assembly can be readily assembled and disassembled into multiple configurations or assembled as one tool for sweeping, transport, and/or storage.

It is therefore one of the main objects of the present invention to provide a multipurpose gardening tool that comprises a broom assembly, a housing assembly, a spike assembly, a rake assembly, and a dustpan assembly.

It is another object of this invention to provide a multipurpose gardening tool that can be assembled in multiple configurations depending on the user's preferences and needs.

It is another object of this invention to provide a multipurpose gardening tool that can be readily assembled and disassembled. It is another object of this invention to provide a multipurpose gardening tool that is volumetrically efficient for transport and storage.

It is another object of this invention to provide a multipurpose gardening tool that is easy-to-use and lightweight.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 2a shows a close up view of a ring at an end of the rake assembly.

FIG. 3B is an isometric view of the spike assembly in combination with the rake assembly.

DETAILED DESCRIPTION OF THE PREFERRED EMBODIMENT

Figure 1:
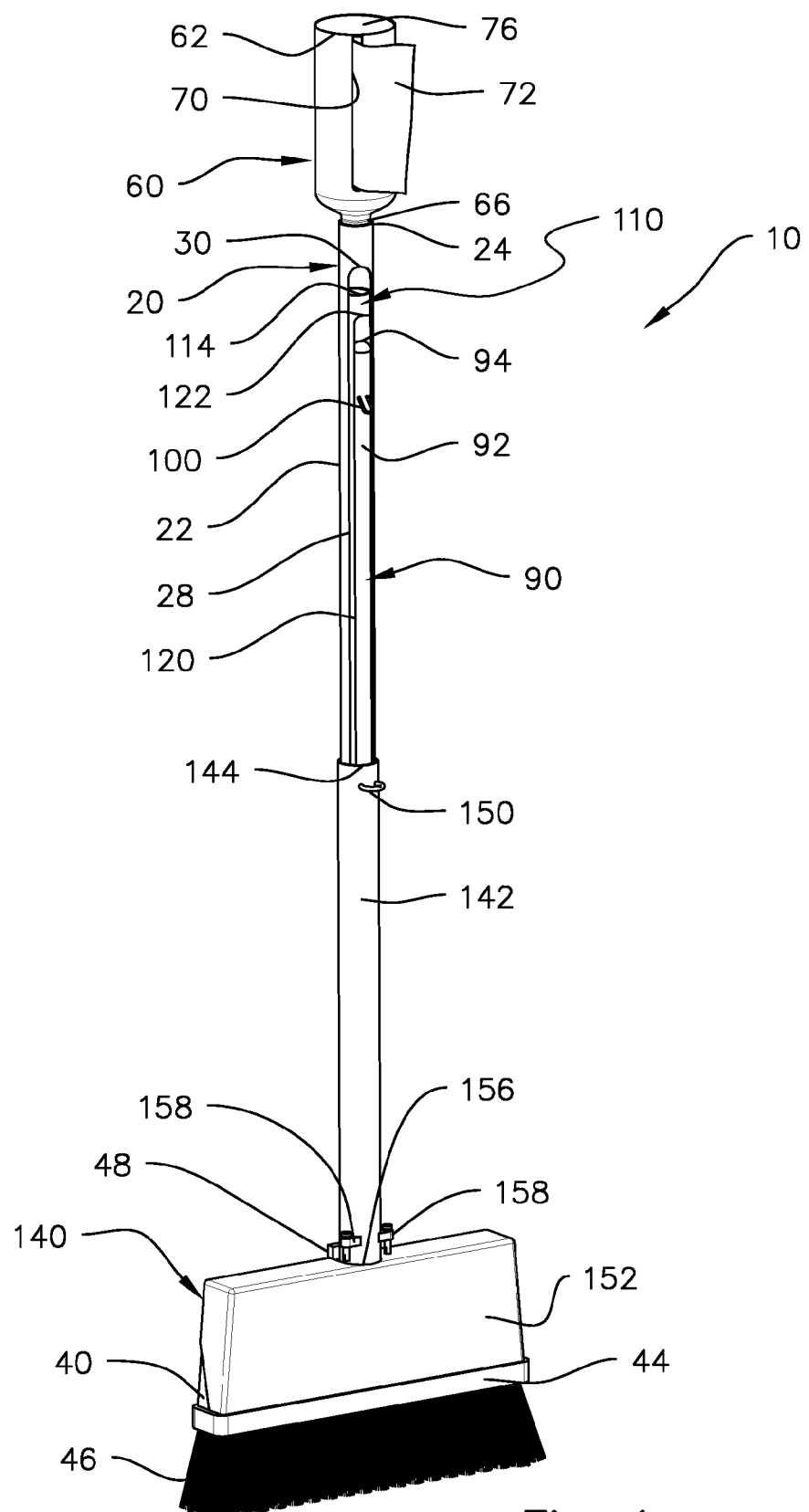
FIG. 1 represents an isometric view of the instant invention.

Referring now to the drawings, the instant invention is referred to with numeral 10. It can be observed that it basically includes broom assembly 20, housing assembly 60, spike assembly 90, rake assembly 110, and dustpan assembly 140.

As seen in FIG. 1, broom assembly 20, housing assembly 60, spike assembly 90, rake assembly 110, and dustpan assembly 140 all combine to form one single multipurpose gardening tool 10. Multipurpose gardening tool 10 can be utilized in commercial or residential settings for gardening and landscaping, whereby broom assembly 20, housing assembly 60, spike assembly 90, rake assembly 110, and dustpan assembly 140 can each detach from each other to utilize each of the above defined in a manner that corresponds with the work to be accomplished.

Figure 2:
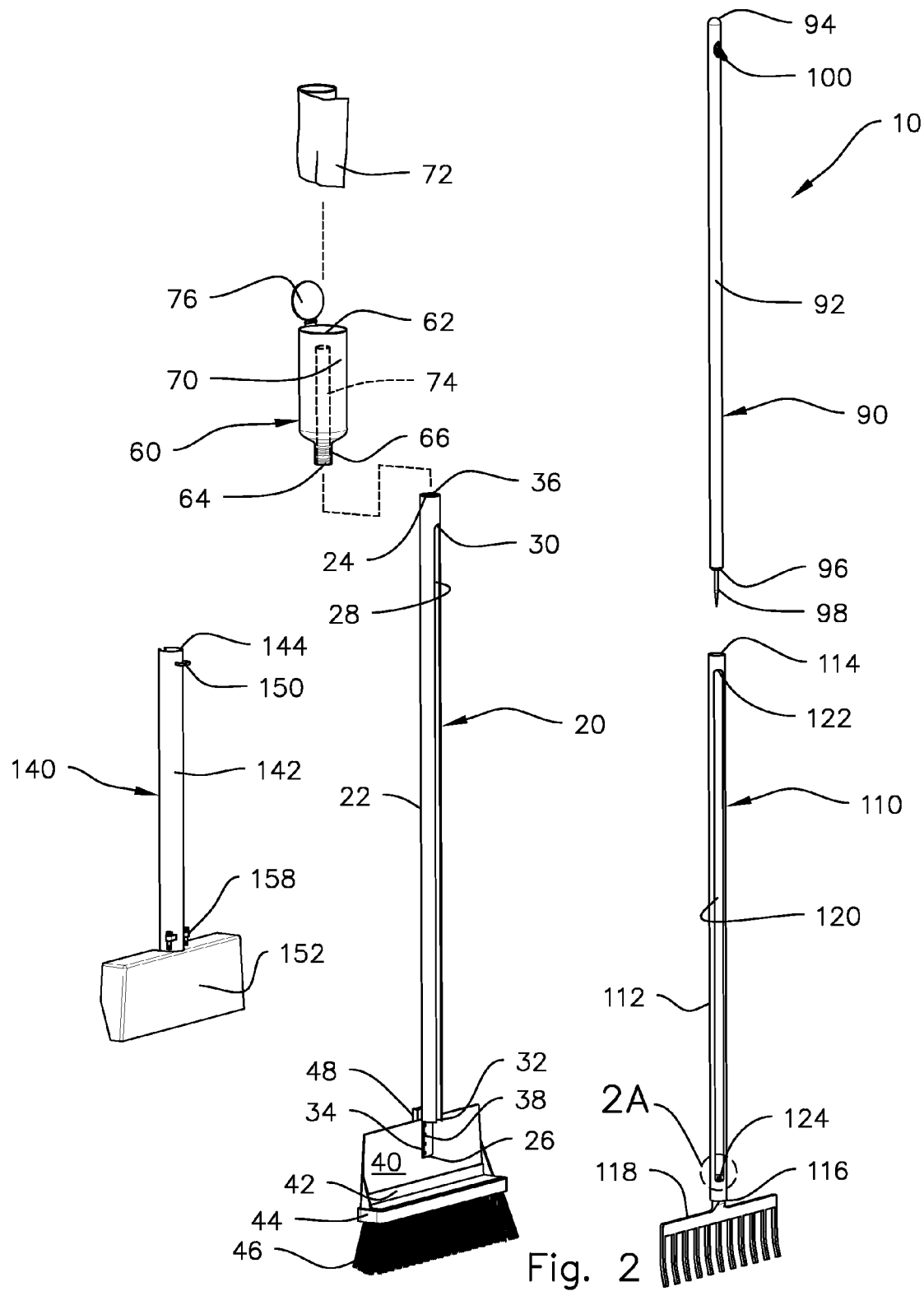
FIG. 2 shows an exploded view of the instant invention.
Figure 3A:
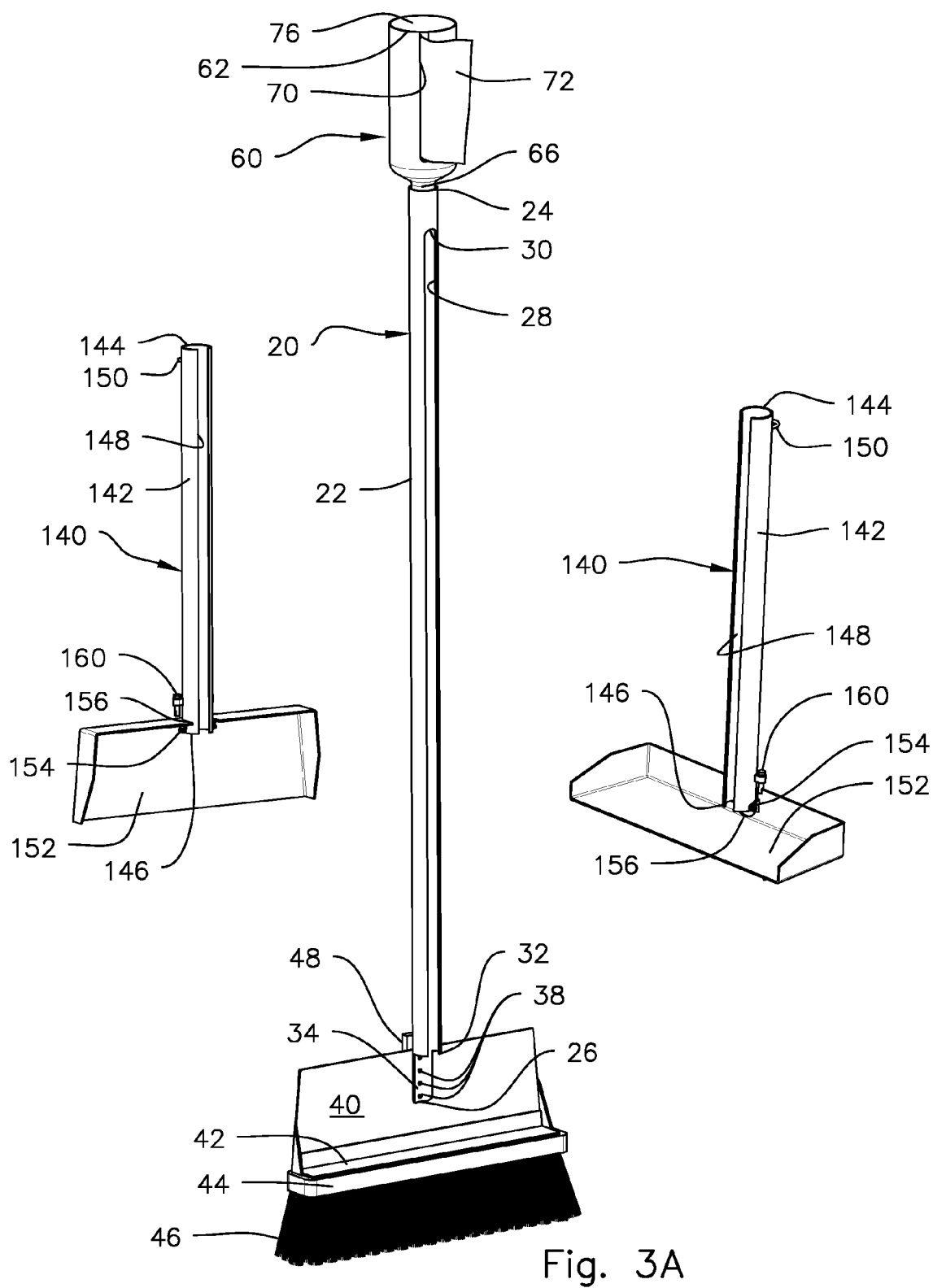
FIG. 3A illustrates an isometric view of the broom assembly in combination with the housing assembly, and the dustpan assembly.

As best seen in FIG. 2, broom assembly 20 comprises elongated handle 22 with ends 24 and 26. Elongated handle 22 is a straight tubular member with notched cutout 28 having ends 30 and 32. Elongated handle 22 further comprises notched cutout 34, as seen in FIG. 3A. An upper end of notched cutout 34 coincides with end 32 and its lower end coincides with end 26. End 24 has internal female threads 36. Elongated handle 22 also has apertures 38 on notched cutout 34. Plate 40 is fixedly mounted to elongated handle 22 with bracket 48. Bracket 48 has screws that screw into apertures 38. Extending approximately perpendicularly from plate 40 is L bracket 42. Secured onto L bracket 42 is brush head 44 having brush/bristles 46 that extend downwardly and outwardly therefrom.

Housing assembly 60 has a tubular shape and comprises a snap lock cap 76, end 62, end 64 having male threads 66, slit 70 that extends downwardly from end 62 a predetermined distance, and central pin 74. When in use, a roll of disposable bags 72 is engaged onto central pin 74 from end 62. An end of an outermost disposable bag 72 protrudes from slit 70. Disposable bags 72 comprise perforations, not seen, to separate one disposable bag 72 from another. A roll of disposable bags 72 comprises a predetermined number of bags, neatly rolled to fit within housing assembly 60. Snap lock cap 76 is hingedly mounted onto end 62 and caps housing assembly 20 to keep disposable bags 72 secure.

Rake assembly 110 has elongated handle 112, ends 114 and 116, and rake 118 that mounts to end 116. Elongated handle 112 is a straight tubular member with notched cutout 120 having ends 122 and 124. As seen in FIG. 2A, ring 126 is located at end 124. Ring 126 has through hole 128 to receive spike 98 of spike assembly 90, whereby end 96 rests upon ring 126. Furthermore, rake 118 has cooperative dimensions and shape to rest on L bracket 42.

Spike assembly 90 comprises elongated handle 92, ends 94 and 96, and spike 98 extending from end 96. Elongated handle 92 has ring handle 100 at a predetermined distance from end 94.

Dustpan assembly 140, as better seen in FIG. 3A, comprises elongated handle 142 with ends 144 and 146, notched cutout 148, and ring handle 150. Ring handle 150 is adjacent to end 144 and opposite to notched cutout 148. Dustpan assembly 140 also comprises dustpan 152 that is hingedly mounted to elongated handle 142 at hinge 154. U-shape notched cutout 156 permits dustpan 152 to rotate approximately 90-degrees with respect to elongated handle 142. Stopper pads 158 and stopper pins 160 limit the rotational movement of dustpan 152 with respect to elongated handle 142.

Multipurpose gardening tool 10 can be assembled in different configurations. The configuration shown in FIG. 1 includes broom assembly 20, housing assembly 60, spike assembly 90, rake assembly 110 and dustpan assembly 140 assembled as one. In this configuration, instant invention 10 can be used to sweep and/or collect waste within disposable bags 72, transport, and/or store.

To assemble instant invention 10 to the configuration seen in FIG. 1, housing assembly 60 mounts onto end 24 of broom assembly 20, and more specifically, male threads 66 mate with female threads 36 to secure housing assembly 60 thereon. Elongated handle 92 snaps into elongated handle 112, whereby elongated handle 112 has a cooperative inside diameter to snugly receive elongated handle 92 through notched cutout 120. It is noted that ring 126 has through hole 128 to receive spike 98 of spike assembly 90 and end 96 rests upon the ledge defined by the ring 126. Elongated handle 112 snaps into elongated handle 22, whereby elongated handle 22 has a cooperative inside diameter to snugly receive elongated handle 112 through notched cutout 28. It is noted that rake 118 rests upon L bracket 42. Elongated handle 142 snaps onto elongated handle 22, whereby elongated handle 142 has a cooperative inside diameter to snugly receive elongated handle 22 through notched cutout 148. It is noted that dustpan 152 also rests upon L bracket 42, covering rake 118 as illustrated in FIG. 1.

In the preferred embodiment, elongated handles 92, 112, 22, and 142 are made out of a resistant and lightweight material such as, but it is not limited to, Poly Vinyl Chloride, plastic, or a material having similar characteristics.

Additionally, multipurpose gardening tool 10 can be assembled into a multitude of various configurations, including those illustrated in FIGS. 3A and 3B. As seen in FIG. 3A, housing assembly 60 houses a roll of disposable bags 72 and an end of an outermost disposable bag 72 protrudes from slit 70. Housing assembly 60 is mounted upon broom assembly 20. In this configuration, a user can sweep and use dustpan assembly 140 to collect waste. Such waste can be grass clippings, leaves, and/or garbage as an example. It is noted that dustpan 152 is hingedly mounted and can be used when in an approximately 90-degree angle with respect to elongated handle 142. In this configuration, a user may utilize instant invention 10 to sweep and collect waste, and dispose the waste within disposable bags 72.

As seen in FIG. 3B, spike assembly 90 is housed within elongated handle 112 through notch cutout 120. In this configuration, a user can use rake assembly 110 to collect waste from a lawn or surface having grass as an example. If the user chooses, the user may remove spike assembly 90 from rake assembly 110 and use it independently to collect waste by stabbing it with spike 98.

All the configurations for multipurpose gardening tool 10 are readily assembled and disassembled depending on the user's preferences and needs.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A multipurpose gardening tool, comprising:
   A) a broom assembly having a first elongated handle and first and second ends, said elongated handle is tubular and comprises a first notched cutout having third and fourth ends, said elongated handle further comprises a plate mounted at said first end, said plate having an L bracket;
   B) a housing assembly having fifth and sixth ends, said fifth end having a cap hingedly mounted thereon and said sixth end removably mounted onto said second end, said housing assembly having a slit extending from said fifth end towards said sixth end without reaching said sixth end, said housing assembly houses at least one disposable bag and an end of said at least one disposable bag protrudes from said slit;
   C) a rake assembly, said rake assembly comprises a second elongated handle having seventh and eighth ends, and a rake that is mounted onto said seventh end, said second elongated handle is tubular and comprises a second notched cutout having ninth and tenth ends, said ninth end having a ring comprising a through hole, said rake assembly snaps into said broom assembly; and
   D) a spike assembly, said spike assembly comprises a third elongated handle having eleventh and twelfth ends, and a spike that is mounted onto said eleventh end, said spike assembly snaps into said rake assembly, said spike aligns with and travels through said hole and said eleventh end rests upon said ninth end when said spike assembly snaps into said rake assembly.

2. The multipurpose gardening tool set forth in claim 1, further comprising a dustpan assembly, said dustpan assembly comprises a fourth elongated handle having thirteenth and fourteenth ends, and a dustpan that is mounted onto said thirteenth end, said fourth elongated handle is tubular and comprises a third notched cutout.

3. The multipurpose gardening tool set forth in claim 2, further characterized in that said dustpan assembly snaps onto said broom assembly.

4. The multipurpose gardening tool set forth in claim 1, further characterized in that said broom assembly is a straight said tubular member, said second end comprises internal female threads, said plate is fixedly mounted onto said first elongated handle with a bracket, secured onto said L bracket is a brush head having bristles.

5. The multipurpose gardening tool set forth in claim 4, further characterized in that said sixth end comprises male threads that cooperatively match said internal female threads, said housing assembly further comprising an internal central pin housed within, a plurality of said at least one disposable bag forms a roll that is mounted onto said internal central pin, said at least one disposable bag has perforations.

6. The multipurpose gardening tool set forth in claim 1, further characterized in that said second elongated handle is straight, and said rake has cooperative dimensions and shape to rest on said L bracket when said rake assembly snaps into said broom assembly.

7. The multipurpose gardening tool set forth in claim 3, further characterized in that said dustpan is hingedly mounted onto said fourth elongated handle and can rotate approximately 90-degrees with respect to said fourth elongated handle, and said dustpan is approximately in a vertical position and resting upon said L bracket when said dustpan assembly snaps onto said broom assembly.

8. The multipurpose gardening tool set forth in claim 1, further characterized in that said second elongated handle snaps into said first elongated handle, whereby said first elongated handle has a first cooperative inside diameter to snugly receive said second elongated handle through said first notched cutout.

9. A multipurpose gardening tool, comprising:
   A) a broom assembly having a first elongated handle and first and second ends, said elongated handle is tubular and comprises a first notched cutout having third and fourth ends, said elongated handle further comprises a plate mounted at said first end, said plate having an L bracket;
   B) a housing assembly having fifth and sixth ends, said fifth end having a cap hingedly mounted thereon and said sixth end removably mounted onto said second end, said housing assembly having a slit extending from said fifth end towards said sixth end without reaching said sixth end, said housing assembly houses at least one disposable bag and an end of said at least one disposable bag protrudes from said slit;
   C) a rake assembly, said rake assembly comprises a second elongated handle having seventh and eighth ends, and a rake that is mounted onto said seventh end, said second elongated handle is tubular and comprises a second notched cutout having ninth and tenth ends, said ninth end having a ring comprising a through hole, said rake assembly snaps into said broom assembly; and
   D) a spike assembly, said spike assembly comprises a third elongated handle having eleventh and twelfth ends, and a spike that is mounted onto said eleventh end, said spike assembly snaps into said rake assembly, further characterized in that said third elongated handle snaps into said second elongated handle, whereby said second elongated handle has a second cooperative inside diameter to snugly receive said third elongated handle through said second notched cutout.

10. The multipurpose gardening tool set forth in claim 3, further characterized in that said fourth elongated handle snaps onto said first elongated handle, whereby said fourth elongated handle has a third cooperative inside diameter to snugly receive said first elongated handle through said third notched cutout.

11. The multipurpose gardening tool set forth in claim 3, further characterized in that said broom assembly, said housing assembly, said spike assembly, said rake assembly, and said dustpan assembly can be readily assembled and disassembled into multiple configurations or assembled as one tool for sweeping, transport, and/or storage.

12. A multipurpose gardening tool, comprising:
   A) a broom assembly having a first elongated handle and first and second ends, said elongated handle is tubular and comprises a first notched cutout having third and fourth ends, said elongated handle further comprises a plate mounted at said first end, said plate having an L bracket, said broom assembly is a straight said tubular member, said second end comprises internal female threads, said plate is fixedly mounted onto said first elongated handle with a bracket, secured onto said L bracket is a brush head having bristles;
   B) a housing assembly having fifth and sixth ends, said fifth end having a cap hingedly mounted thereon and said sixth end removably mounted onto said second end, said housing assembly having a slit extending from said fifth end towards said sixth end without reaching said sixth end, said housing assembly houses at least one disposable bag and an end of said at least one disposable bag protrudes from said slit, said sixth end comprises male threads that cooperatively match said internal female threads, said housing assembly further comprising an internal central pin housed within, a plurality of said at least one disposable bag forms a roll that is mounted onto said internal central pin, said at least one disposable bag has perforations; and C) a rake assembly, said rake assembly comprises a second elongated handle having seventh and eighth ends, and a rake that is mounted onto said seventh end, said second elongated handle is tubular and comprises a second notched cutout having ninth and tenth ends, said ninth end having a ring comprising a through hole, said rake assembly snaps into said broom assembly;

D) a spike assembly, said spike assembly comprises a third elongated handle having eleventh and twelfth ends, and a spike that is mounted onto said eleventh end, said spike assembly snaps into said rake assembly; and E) a dustpan assembly, said dustpan assembly comprises a fourth elongated handle having thirteenth and fourteenth ends, and a dustpan that is mounted onto said thirteenth end, said fourth elongated handle is tubular and comprises a third notched cutout, said dustpan assembly snaps onto said broom assembly, further characterized in that said second elongated handle is straight, and said rake has cooperative dimensions and shape to rest on said L bracket when said rake assembly snaps into said broom assembly, said spike aligns with and travels through said hole and said eleventh end rests upon said ninth end when said spike assembly snaps into said rake assembly, said dustpan is hingedly mounted onto said fourth elongated handle and can rotate approximately 90-degrees with respect to said fourth elongated handle, and said dustpan is approximately in a vertical position and resting upon said L bracket when said dustpan assembly snaps onto said broom assembly, said second elongated handle snaps into said first elongated handle, whereby said first elongated handle has a first cooperative inside diameter to snugly receive said second elongated handle through said first notched cutout, said third elongated handle snaps into said second elongated handle, whereby said second elongated handle has a second cooperative inside diameter to snugly receive said third elongated handle through said second notched cutout, said fourth elongated handle snaps onto said first elongated handle, whereby said fourth elongated handle has a third cooperative inside diameter to snugly receive said first elongated handle through said third notched cutout, said broom assembly, said housing assembly, said spike assembly, said rake assembly, and said dustpan assembly can be readily assembled and disassembled into multiple configurations or assembled as one tool for sweeping, transport, and/or storage.

* * * * *